US012392190B2

(12) United States Patent
Takada et al.

(10) Patent No.: US 12,392,190 B2
(45) Date of Patent: Aug. 19, 2025

(54) OPENING-CLOSING BODY CONTROL DEVICE OF VEHICLE

(71) Applicant: MAZDA MOTOR CORPORATION, Hiroshima (JP)

(72) Inventors: Kohji Takada, Hiroshima (JP); Keita Higuchi, Hiroshima (JP); Jiyou Piao, Hiroshima (JP); Tomoya Kuroda, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 414 days.

(21) Appl. No.: 18/050,280

(22) Filed: Oct. 27, 2022

(65) Prior Publication Data

US 2023/0220716 A1 Jul. 13, 2023

(30) Foreign Application Priority Data

Jan. 11, 2022 (JP) ................................ 2022-002178

(51) Int. Cl.
*E05F 15/611* (2015.01)

(52) U.S. Cl.
CPC ......... *E05F 15/611* (2015.01); *E05Y 2400/36* (2013.01); *E05Y 2400/40* (2013.01)

(58) Field of Classification Search
CPC .... E05F 15/611; E05F 15/70; E05Y 2400/40; E05Y 2400/36; E05Y 2900/546
See application file for complete search history.

(56) References Cited

U.S. PATENT DOCUMENTS

2006/0137136 A1* 6/2006 Imai ...................... E05F 15/662 16/52
2019/0063137 A1* 2/2019 Suzuki ...................... B60J 1/17

FOREIGN PATENT DOCUMENTS

JP 5421344 B2 * 2/2014 ............. E05F 15/41
JP 2021-067053 A 4/2021

OTHER PUBLICATIONS

English translation of JP-5421344-B2 (Year: 2014).*

* cited by examiner

*Primary Examiner* — Justin S Lee
*Assistant Examiner* — Alexander George Matta
(74) *Attorney, Agent, or Firm* — Studebaker Brackett PLLC

(57) ABSTRACT

A speed of an opening-closing action of a back door, for example, is changed from an acceleration area to a deceleration area by way of a constant-speed area, and an opening-closing action of the back door is configured to come to an end in the deceleration area. In the deceleration area, deceleration (a second deceleration in FIG. 3, a fourth deceleration in FIG. 4) of an opening-closing action of the back door at a point before the opening-closing action of the back door comes to the end is set to be smaller than another deceleration (a first deceleration in FIG. 3, a third deceleration in FIG. 4) of the opening-closing action of the back door at a deceleration start point of the opening-closing action of the back door.

13 Claims, 6 Drawing Sheets

OPENING-CLOSING BODY CONTROL DEVICE OF VEHICLE

BACKGROUND OF THE INVENTION

The present invention relates to an opening-closing body control device of a vehicle.

A vehicle is provided with an opening-closing body to partition an inside of the vehicle from an outside of the vehicle, such as a side door or a back door. Japanese Patent Laid-Open Publication No. 2021-67053 discloses a control device to perform an opening-closing control of a back door (a lift gate), which is configured to open or close a rear opening portion formed at a vehicle-body rear part, at a predetermined target speed. In the device disclosed in this patent document, a map for setting the above-described target speed comprises an acceleration area which flows an action start, a constant-speed area which follows the acceleration area, and a deceleration area which follows the constant-speed area. Deceleration in the above-described deceleration area is set at a constant value in a range from a deceleration stat to a deceleration end (i.e., the target speed is set in a linearly-change manner).

In a case where opening or closing of opening-closing body is performed at the constant or nearly constant deceleration in the deceleration area like the above-described device disclosed in the patent document, the opening-closing action comes to an end rather quickly, so that the large kinetic energy which the opening-closing body may have is given directly to a drive section or the like. This may cause noise generation and deterioration of the durability of members related to the opening-closing action. Further, the improperly-large energy to drive the opening-closing body may be required, so that energy consumption of a battery may be increased. In addition, since it may appear to a user that the opening-closing body stops due to a driving force of the opening-closing action, the user may not obtain a high-quality feeling about the action of the opening-closing body.

SUMMARY OF THE INVENTION

The present invention has been devised in view of the above-described matters, and an object of the present invention is to provide an opening-closing body control device of a vehicle which can properly suppress the opening-closing action from coming to an end with the large energy and the quick response and provide the user with the high-quality feeling regarding the action of the opening-closing body.

A first aspect of the present invention is the opening-closing body control device of the vehicle, comprising an opening-closing body constituting a part of a vehicle body and partitioning an inside of the vehicle body from an outside of the vehicle body in a closed state, a drive section to open or close the opening-closing body, an opening-command detection section to detect an opening command of the opening-closing body by a user, and a drive control section to control the drive section such that the opening-closing body is opened by a predetermined first speed-change manner when the opening-command detection section detects the opening command in the closed state of the opening-closing body, wherein the first speed-change manner is configured to comprise a first acceleration area where the opening of the opening-closing body is accelerated, a first constant-speed area where the opening of the opening-closing body is performed substantially at a constant speed, which follows the first acceleration area, and a first deceleration area where the opening of the opening-closing body is decelerated, which follows the first constant-speed area, and the first deceleration area is configured such that a second deceleration of the opening of the opening-closing body at a point just before the opening of the opening-closing body comes to an end is smaller than a first deceleration of the opening of the opening-closing body at a deceleration start point.

According to the first aspect of the present invention, since the speed can be decreased promptly by setting the large first deceleration, the second deceleration at the point just before ending of the opening action can be made sufficiently small. Thereby, the ending of the opening action is conducted slowly, not quickly, so that suppression of the noise generation, reduction of the drive energy (reduction of the battery's energy consumption), and improvement of the durability of the members related to the opening-closing action can be attained. Further, the user can get the high-quality feeling by seeing the slow ending of the opening action. In particular, a door opening action performed in a high-quality restaurant or hotel in Japan in such a manner that opening of the door is ended at a slow pace can create the high-quality feeling, and this kind of high-quality feeling can be properly provided by setting the above-described small second deceleration.

In an embodiment of the first aspect of the present invention, in a case where an elapsed time from a deceleration start to a deceleration end in the first deceleration area is represented as TA, a border point between the first deceleration and the second deceleration is set to be within a range of 0.4-0.6 TA from the deceleration start.

According to this embodiment, the above-described effects of the first aspect of the present invention can be obtained sufficiently by optimizing an execution ratio of the first deceleration and the second deceleration.

In another embodiment of the first aspect of the present invention, deceleration from the first deceleration to the second deceleration is changed smoothly.

According to this embodiment, the high-quality feeling can be further improved.

In another embodiment of the first aspect of the present invention, in a case where an elapsed time from a deceleration start to a deceleration end in the first deceleration area is represented as TA and an opening speed in the first constant-speed area is represented as VA, the opening speed at a point of the elapsed time TA/4 from the deceleration start is set at around 0.5 VA, whereas the opening speed at a point of the elapsed time TA/2 from the deceleration start is set at 0.3 VA or lower.

According to this embodiment, the first deceleration and the second deceleration can be set properly.

In another embodiment of the first aspect of the present invention, acceleration in the first acceleration area is set to be within a range of 500-800 mm/ss (s=second).

According to this embodiment, the appropriate acceleration can be provided without giving the user with a sense of danger or redundancy.

In another embodiment of the first aspect of the present invention, the opening-closing body is a back door to open or close a rear opening portion formed at a rear part of the vehicle body, which is provided to swing in a vertical direction around a hinge provided at an upper portion of the back door.

According to this embodiment, since the back door is a large and heavy object, the effects of the noise-generation suppression, the reduction of the drive energy (the reduction of the battery's energy consumption), and the improvement of the durability of the members related to the opening-closing action can be obtained sufficiently. Further, the user can get the high-quality feeling sufficiently by seeing the slow ending of the opening action of the back door as the large and heavy object.

In another embodiment of the first aspect of the present invention, when the back door is swingingly opened upwardly, an acceleration end timing of the first acceleration area in the first speed-change manner is set such that a level of a specified position of the back door which becomes a lower-end position when the back door is closed is located at 130 cm or lower from a ground level, whereas a deceleration start timing of the first deceleration area in the first speed-change manner is set such that the level of the specified position of the back door is located at 190 cm or higher from the ground level.

According to this embodiment, the user who is positioned behind the back door can be properly suppressed from feeling the acceleration in the acceleration area and having the sense of danger. Likewise, this user can be properly suppressed from feeling the deceleration in the acceleration area and having the sense of redundancy.

A second aspect of the present invention is the opening-closing body control device of the vehicle, comprising an opening-closing body constituting a part of a vehicle body and partitioning an inside of the vehicle body from an outside of the vehicle body in a closed state, a drive section to open or close the opening-closing body, a closing-command detection section to detect a closing command of the opening-closing body by a user, and a drive control section to control the drive section such that the opening-closing body is closed by a predetermined second speed-change manner when the closing-command detection section detects the closing command in an open state of the opening-closing body, wherein the second speed-change manner is configured to comprise a second acceleration area where the closing of the opening-closing body is accelerated, a second constant-speed area where the closing of the opening-closing body is performed substantially at a constant speed, which follows the second acceleration area, and a second deceleration area where the closing of the opening-closing body is decelerated, which follows the second constant-speed area, and the second deceleration area is configured such that the deceleration of the closing of the opening-closing body comprises a third deceleration, a fourth deceleration which is smaller than the third deceleration, and a fifth deceleration which is larger than the third deceleration which are positioned in order from a deceleration start, wherein the fifth deceleration is the deceleration at a point just before the closing of the opening-closing body comes to an end.

According to the second aspect of the present invention, since the speed can be decreased promptly by setting the large third deceleration, the fourth deceleration at the point just before ending of the opening action can be made sufficiently small. Thereby, the ending of the closing action is conducted slowly, not quickly, so that the suppression of the noise generation, the reduction of the drive energy (the reduction of the battery's energy consumption), and the improvement of the durability of the members related to the opening-closing action can be attained. Further, the user can get the high-quality feeling by seeing the slow ending of the closing action. In particular, a door closing action performed in the high-quality restaurant or hotel in Japan in such a manner that closing of the door is ended at a slow pace can create the high-quality feeling, and this kind of high-quality feeling can be properly provided by setting the above-described small fourth deceleration. In addition, the opening-closing body can be securely located at the closed position by the larger fifth deceleration at the point just before ending of the closing action.

In an embodiment of the second aspect of the present invention, the opening-closing body is a full-latch type in which the opening-closing body is fully closed by way of a half-latch state, and a shifting point when the deceleration of the closing of the opening-closing body is shifted from the fourth deceleration to the fifth deceleration is set at a start point of the half-latch state, and a closing speed of the opening-closing body at the start point of the half-latch state is set at a closing speed capable of attaining the half-latch state or higher.

According to this embodiment, in a case where the opening-closing body is held at the closing position by a latch, the half-latch state is attained securely, thereby preparing for the full-latch state.

In another embodiment of the second aspect of the present invention, in a case where an elapsed time from a deceleration start to the start point of the half-latch state in the second deceleration area is represented as TB and a difference between a closing speed in the second constant-speed area and the closing speed at the start point of the half-latch state is represented as VB, the closing speed at a point of the elapsed time TA/4 from the deceleration start is set at around 0.7 VB, whereas the closing speed at a point of the elapsed time TB/2 from the deceleration start is set at 0.4 VB or lower.

According to this embodiment, the above-described effects of the second aspect of the present invention can be obtained sufficiently by setting the appropriate deceleration manner from the third deceleration to the fourth deceleration.

In another embodiment of the second aspect of the present invention, in a case where an elapsed time from a deceleration start to the start point of the half-latch state in the second deceleration area is represented as TB, a border point between the third deceleration and the fourth deceleration is set to be within a range of 0.4-0.6 TB from the deceleration start in the second deceleration area.

According to this embodiment, the above-described effects of the second aspect of the present invention can be obtained sufficiently by optimizing an execution ratio of the third deceleration and the fourth deceleration.

In another embodiment of the second aspect of the present invention, acceleration in the second acceleration area is set to be within 500-800 mm/ss (s=second).

According to this embodiment, the appropriate acceleration can be provided without giving the user with the sense of danger or redundancy.

In another embodiment of the second aspect of the present invention, the opening-closing body is a back door to open or close a rear opening portion formed at a rear part of the vehicle body, which is provided to swing in a vertical direction around a hinge provided at an upper portion of the back door.

According to this embodiment, since the back door is the large and heavy object, the effects of the noise-generation suppression, the reduction of the drive energy (the reduction of the battery's energy consumption), and the improvement of the durability of the members related to the opening-closing action can be obtained sufficiently. Further, the user can get the high-quality feeling sufficiently by seeing the slow ending of the closing action of the back door as the large and heavy object.

In another embodiment of the second aspect of the present invention, when the back door is swingingly closed downwardly, an acceleration end timing of the second acceleration area in the second speed-change manner is set such that a level of a specified position of the back door which becomes a lower-end position when the back door is closed is located at 190 cm or higher from a ground level, whereas a deceleration start timing of the second deceleration area in the second speed-change manner is set such that the level of the specified position of the back door is located at 130 cm or lower from the ground level.

According to this embodiment, the user who is positioned behind the back door can be properly suppressed from feeling the acceleration in the acceleration area and having the sense of danger. Likewise, this user can be properly suppressed from feeling the deceleration in the acceleration area and having the sense of redundancy.

A third aspect of the present invention is the opening-closing body control device of the vehicle, comprising an opening-closing body constituting a part of a vehicle body and partitioning an inside of the vehicle body from an outside of the vehicle body in a closed state, a drive section to open or close the opening-closing body, an opening-command detection section to detect an opening command of the opening-closing body by a user, a closing-command detection section to detect a closing command of the opening-closing body by a user, and a drive control section to control the drive section such that the opening-closing body is opened by a predetermined first speed-change manner when the opening-command detection section detects the opening command in the closed state of the opening-closing body and that the opening-closing body is closed by a predetermined second speed-change manner when the closing-command detection section detects the closing command in an open state of the opening-closing body, wherein the first speed-change manner is configured to comprise a first acceleration area where the opening of the opening-closing body is accelerated, a first constant-speed area where the opening of the opening-closing body is performed substantially at a constant speed, which follows the first acceleration area, and a first deceleration area where the opening of the opening-closing body is decelerated, which follows the first constant-speed area, the first deceleration area is configured such that a second deceleration of the opening of the opening-closing body at a point just before the opening of the opening-closing body comes to an end is smaller than a first deceleration of the opening of the opening-closing body at a deceleration start point, the second speed-change manner is configured to comprise a second acceleration area where the closing of the opening-closing body is accelerated, a second constant-speed area where the closing of the opening-closing body is performed substantially at a constant speed, which follows the second acceleration area, and a second deceleration area where the closing of the opening-closing body is decelerated, which follows the second constant-speed area, and the second deceleration area is configured such that the deceleration of the closing of the opening-closing body comprises a third deceleration, a fourth deceleration which is smaller than the third deceleration, and a fifth deceleration which is larger than the third deceleration which are positioned in order from a deceleration start, wherein the fifth deceleration is the deceleration at a point just before the closing of the opening-closing body comes to an end.

According to the third aspect of the present invention, both of the above-described effects of the first and second aspects of the present invention can be obtained.

In an embodiment of the third aspect of the present invention, the opening-closing body is a back door to open or close a rear opening portion formed at a rear part of the vehicle body, which is provided to swing in a vertical direction around a hinge provided at an upper portion of the back door, when the back door is swingingly opened upwardly, an acceleration end timing of the first acceleration area in the first speed-change manner is set such that a level of a specified position of the back door which becomes a lower-end position when the back door is closed is located at 130 cm or lower from a ground level, whereas a deceleration start timing of the first deceleration area in the first speed-change manner is set such that the level of the specified position of the back door is located at 190 cm or higher from the ground level, and when the back door is swingingly closed downwardly, an acceleration end timing of the second acceleration area in the second speed-change manner is set such that the level of the specified position of the back door is located at 190 cm or higher from the ground level, whereas a deceleration start timing of the second deceleration area in the second speed-change manner is set such that the level of the specified position of the back door is located at 130 cm or lower from the ground level.

According to this embodiment, since the back door is the large and heavy object, the effects of the noise-generation suppression, the reduction of the drive energy (the reduction of the battery's energy consumption), and the improvement of the durability of the members related to the opening-closing action can be obtained sufficiently. Further, the user can get the high-quality feeling sufficiently by seeing the slow ending of the opening action and the closing action of the back door as the large and heavy object. Additionally, the user who is positioned behind the back door can be properly suppressed from feeling the acceleration in the acceleration area and having the sense of danger. Likewise, this user can be properly suppressed from feeling the deceleration in the acceleration area and having the sense of redundancy.

In another embodiment of the third aspect of the present invention, an elapsed time from an opening start to an opening end of the opening-closing body in the first speed-change manner is set to be within a range of 4.5-5.5 sec, and an elapsed time from a closing start to a closing end of the opening-closing body in the second speed-change manner is set to be within the range of 4.5-5.5 sec.

According to this embodiment, the opening-closing speed is not so fast that the use can be properly suppressed from having the sense of danger for the opening-closing action, whereas the opening-closing speed is not so slow that the use can be properly suppressed from having the sense of redundancy.

As described above, the present invention can properly suppress the opening-closing action from coming to the end with the large energy and the quick response and provide the user with the high-quality feeling regarding the action of the opening-closing body.

The present invention will become apparent from the following description which refers to the accompanying drawings.

DETAILED DESCRIPTION OF THE INVENTION

Figure 1:
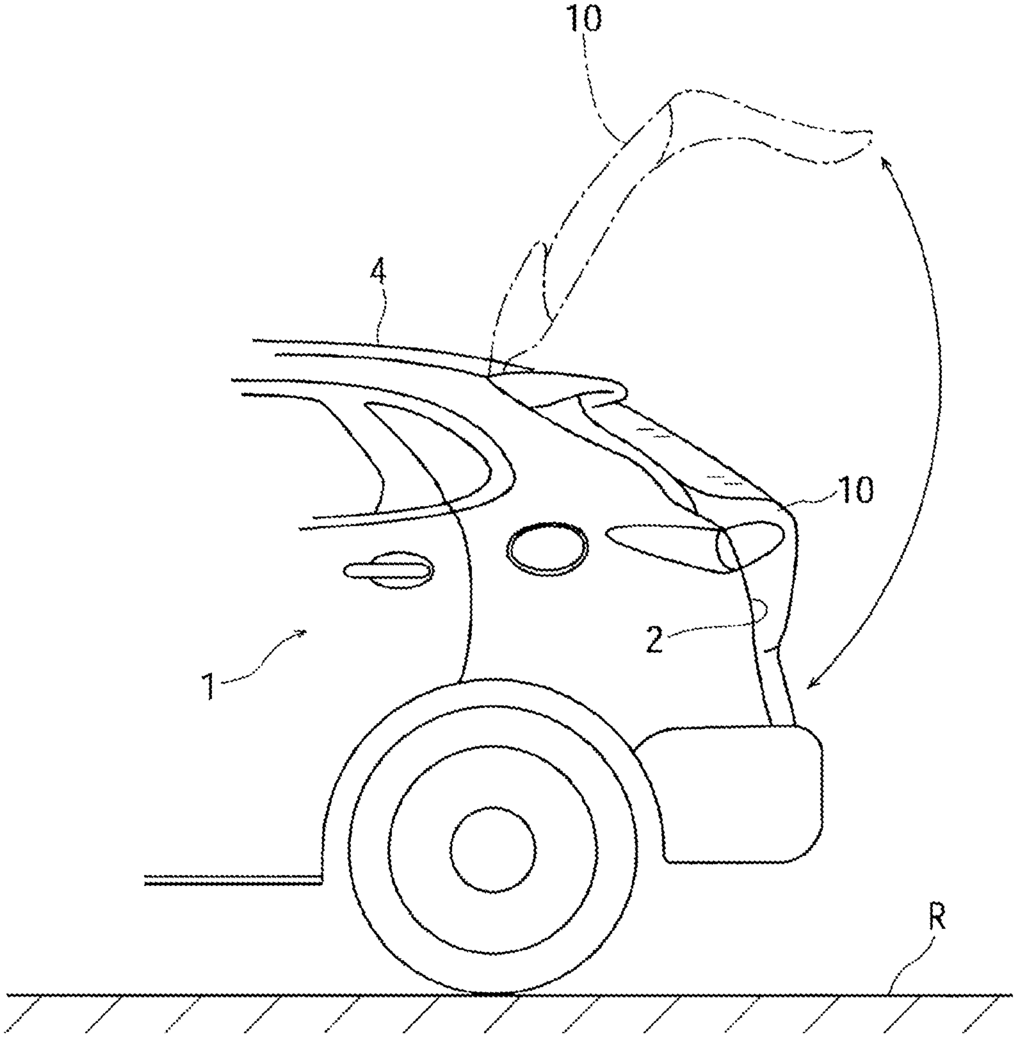
FIG. 1 is a side view showing a rear part of a vehicle to which the present invention is applied, in which a back door in a closed state is shown by a solid line and the back door in a open state is shown by a one-dotted broken line.
Figure 2:
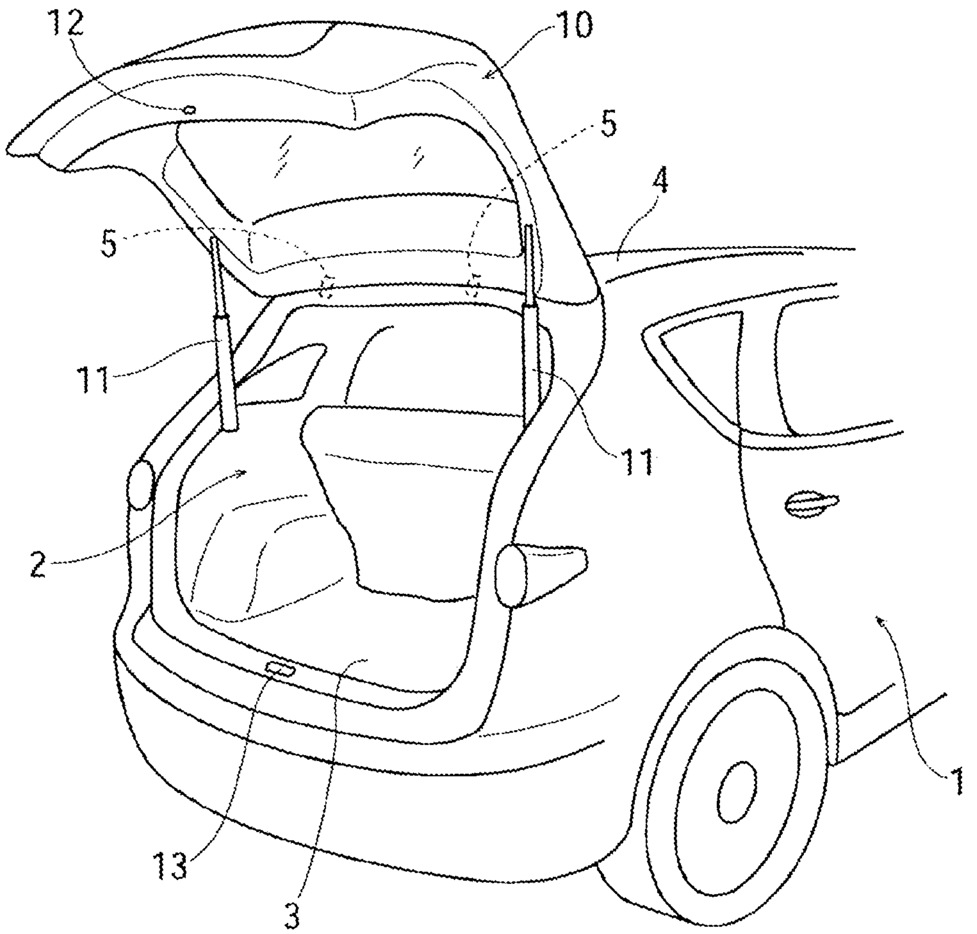
FIG. 2 is a rear perspective view showing a state where the back door of the vehicle shown in FIG. 1 is open.

[1] Outline of Whole Part [FIGS. 1 and 2]

A vehicle's whole part will be described referring to FIGS. 1 and 2. Reference character 1 denotes a vehicle in the figures. The vehicle 1 is a SUV vehicle in an embodiment, which comprises a rear opening portion 2 which is formed widely at a rear part of a vehicle body. The wide rear opening portion 2 is configured such that its vertical length extends from a rear floor panel 3 to a roof panel 4.

The rear opening portion 2 is opened or closed with a back door 10 as an opening-closing body. An upper portion of the back door 10 is rotatably connected to a rear portion (rear header) of the roof panel 4 via a pair of hinges 5. The back door 10 is configured to swing vertically around the hinges 5 so as to take a closed state (entirely-closed state) shown by a solid line in FIG. 1 and an open state (entirely-open state) shown by a one-dotted broken line in FIG. 1 and also shown by a solid line in FIG. 2. Hereafter, the back door 10 will be referred to as a lift gate sometimes.

In the present embodiment, a level (height) of a specified position of the back door 10 which becomes a lower-end position (a swing-end position around the hinges 5) of the back door 10 when the back door 10 takes the closed state (i.e., the back door 10 is entirely closed) is set to be located at 2 m or higher from a ground level R in the open state of the back door 10. Meanwhile, in the closed state of the back door 10, the level of the above-described specified position of the back door 10 is set to be located at nearly 50 cm from the ground level R. However, the present invention is not limited to these setting levels.

A pair of right-and-left expandable rod-type actuators 11 to open or close the back door 10 are provided. This actuator 11 is a drive section to open or close the back door 10, one end of which is rotatably connected to the back door 11 and the other end of which is rotatably connected to the vehicle body. The back door 10 is driven in an open direction by the expanding actuator 11, whereas the back door 10 is driven in a closed direction by the contracting actuator 11.

An expanding-contracting action of the actuator 11 is attained by a forward-backward rotation of a drive motor which is installed in the actuator 11 (not illustrated in FIGS. 1 and 2). Further, an opening-closing speed of the back door 10 is changed by a speed change of the drive motor. A device like a spindle drive mechanism described in the above-described patent document, for example, is applicable as the actuator 11. Of course, since the above-described actuator 11 itself is well known because it is installed to various kinds of vehicle, further description is omitted here.

A striker 12 is provided at a specified position of the back door 10 which becomes a lower-end position of the back door 10 when the back door 10 is closed, and a latch 13 to engage with the striker 12 is provided at the vehicle body. Herein, the striker 12 may be provided at the vehicle body, whereas the latch 13 may be provided at the back door 10.

A latch motor (not illustrated in FIGS. 1 and 2) is provided at the latch 13. That is, the back door 10 can be driven in the open direction by releasing the latch 13 by means of the latch motor from the closed state where the back door 10 is closed by means of the latch 13. Further, when the back door 10 is changed from the open state to the closed state, a latch state is changed to a full-latch state by way of a half-latch state by driving the latch motor.

Figure 3:
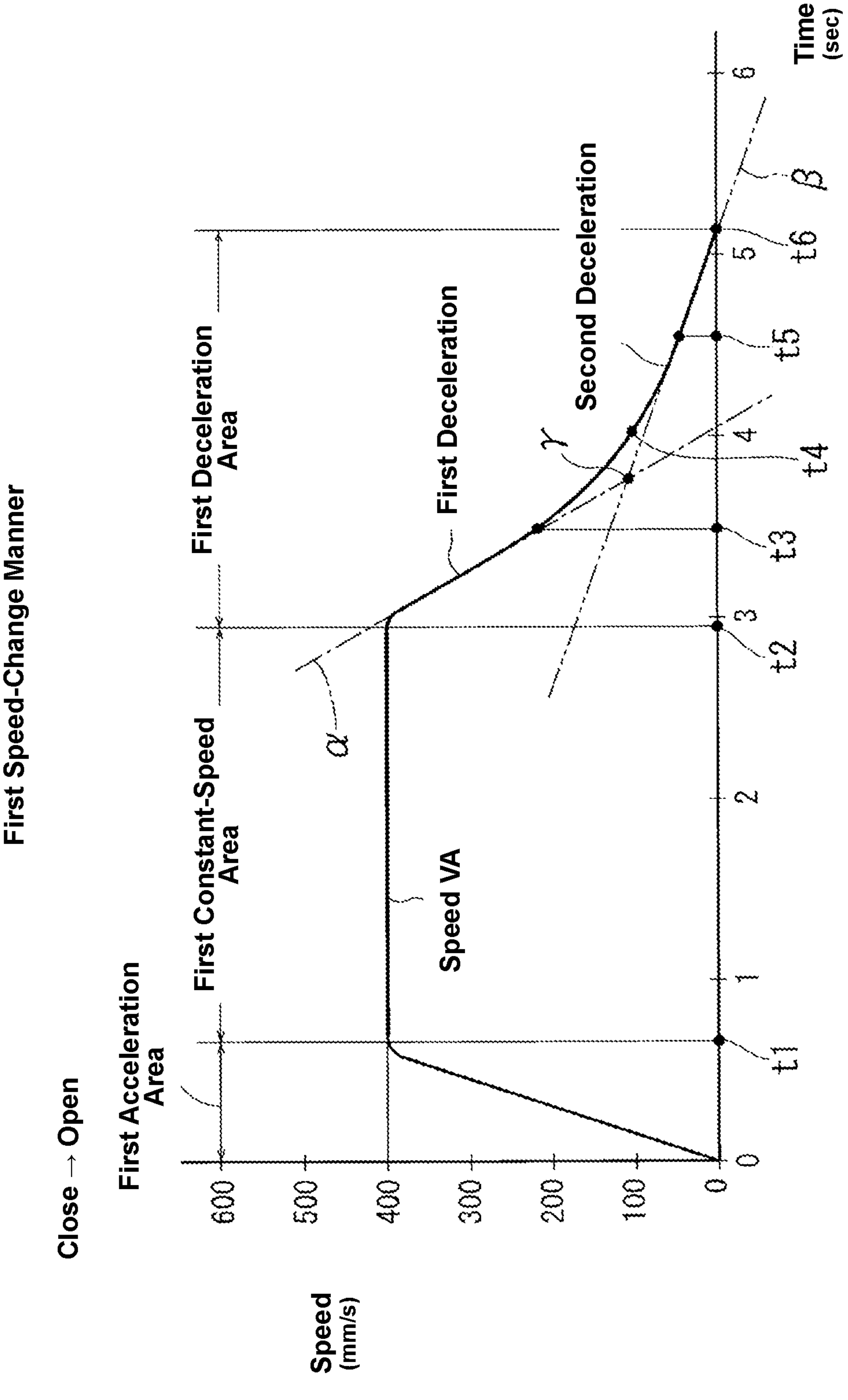
FIG. 3 is a diagram showing a first speed-change manner in a case where the back door is changed from the closed state to the open state.

[2] Opening Action of Back Door [First Speed-Change Manner Shown in FIG. 3]

The opening drive of the back door taking the closed state (the entirely-closed state) is performed according to a target opening speed shown in FIG. 3. FIG. 3 shows a map with parameters of the time and the target opening speed of the back door 10, which shows a first speed-change manner. Herein, the opening speed (target opening speed) shows a normal-direction speed (normal-direction speed in the opening direction) for an imaginary line which connects the lower-end position (specified position) located at a center, in a vehicle width direction, of the back door 10 taking the closed state and a swinging center (hinges 5) of the back door 10 in a side view.

Details of the first speed-change manner shown in FIG. 3 will be described. First, a starting point of an opening action of the back door 10 is set as an origin point, and an initial area is set as a first acceleration area in which the opening speed increases gradually. While the first acceleration area of the present embodiment is configured such that the opening speed increases linearly, non-liner increasing is also applicable (for example, an initial acceleration is relatively small but the following acceleration becomes relatively large). When the opening speed of the back door 10 reaches a specified speed VA (400 mm/s in a case of FIG. 3), the first acceleration area ends. This ending point is shown by t1. The first acceleration area ends in a short period of time, i.e., in one second or less, from the opening-action start.

A first constant-speed area follows after the t1 point when the back door 10 is continuously driven in the open direction at a specified constant speed VA. The first constant-speed area continues up to a t2 point when is slightly before an elapsed time of 3 sec from the opening-action start of the back door 10. Herein, the specified constant speed in the first constant-speed area may have some speed tolerance of about 10%.

A first deceleration area starts after the t2 point. In this area, the opening speed of the back door 10 decreases gradually. A t6 point is an ending point of the first deceleration area, when the back door 10 takes the open state (entirely-open state).

In the first deceleration area, the deceleration is executed at a first deceleration, which is larger than the deceleration at a point just after the deceleration start, and then the deceleration is executed at a second deceleration in the middle, which is smaller than the first deceleration. In the present embodiment, the first deceleration and the second deceleration show a liner-like curve, respectively, and it is set that the curve of the first deceleration smoothly shifts to the curve of the second deceleration.

In FIG. 3, a tangential line of a section of the first deceleration is denoted by reference character $\alpha$, and a tangential line of a section of the second deceleration is denoted by reference character $\beta$. An intersection between the both lines $\alpha$, $\beta$ is denoted by reference character $\gamma$. This point $\gamma$ can be positioned as a border point between the first deceleration and the second deceleration. Herein, in a case where a gross execution time of the first deceleration area is represented as TA, the position of the point $\gamma$ is set at a point when the time of 0.4-0.6 TA passes from the deceleration start point t2. In particular, the second deceleration performs the extremely-slow opening action until the opening-action ending, which is the action capable of providing the high-quality feeling. In order to make the user feel this second deceleration to cause the high-quality feeling sufficiently (securely), it is preferable that the execution time of the second deceleration be prolonged. For example, the elapsed time from the intersection point γ to the t6 point can be set at 0.8 sec or longer, preferably at 1.0 sec or longer.

Since the second deceleration which is the small deceleration is applied in a range from the point slightly before the opening-action end of the back door 10 to the opening-action end of the back door 10, the opening action can be provided with the high-quality feeling, the impact can be properly small in the open state (suppression of the kinetic-energy loss, suppression of the noise generation, and improvement of the durability of the members), and the energy consumption of the battery can be properly reduced because of decreasing of the drive energy (electricity) of the actuator 11.

A preferable setting example of the first deceleration and the second deceleration will be described. First, the gross execution time of the first deceleration area (the time from the t2 point to the t6 point) is represented as TA, and the specified constant speed in the first constant-speed area is represented as VA. Further, a point of an elapsed time TA/4 from the t2 point as the deceleration start point is represented as t3, another point of an elapsed time TA/2 from the t2 point is represented as t4, and further another point of an elapsed time 3 TA/4 from the t2 point is represented as t5. Herein, the t5 point is the position where the tangential line β passes.

The speed at the t3 point is set at the vicinity of a half of VA (in a case where a range of the vicinity is set at ±10%, this speed is set at VA/2±0.1 VA in the present embodiment). Further, the speed at the t4 point is set at 30% of VA or less (this speed is set at 0.3 VA in the present embodiment). The speed at the t3 point and the speed at the t5 point are set to be smoothly continuous to each other by way of the speed at the point t4. Thus, the deceleration in the first deceleration area comprising the first deceleration and the second deceleration are set. Herein, the first deceleration and the second deceleration may be set to have a liner (straight line) shape, respectively (no smooth connection).

Compared to the above-described speed setting in the first deceleration area, a first comparative manner in which the first deceleration has a larger deceleration (for example, the speed at the t3 point is 0.3 VA and the intersection point γ is shifted to a leftward-and-downward side in FIG. 3) is considered. In this first comparative manner, the possibility that the user feels so quick deceleration in the initial state and also the user has the sense of redundancy because of the longer time of the opening action with the second deceleration may become high.

In a second comparative example in which the first deceleration has a smaller deceleration (for example, the speed at the t3 point is 0.7 VA and the intersection point γ is shifted to a rightward-and-upward side in FIG. 3), compared to the above-described speed setting in the first deceleration area, it becomes difficult for the user to feel the difference between the first deceleration and the second deceleration (the deceleration becomes a linear-like deceleration as a whole), so that the effect of providing the user with the high-quality feeling which may be caused by the second deceleration may be deteriorated. Herein, in order to make the user feel the second deceleration clearly, it is preferable that the second deceleration be set to be sufficiently smaller than the first deceleration, e.g., at ½ of the second deceleration or less, preferably ⅓ or less, and more preferably ¼ or less.

Other preferable conditions to be considered in setting the first speed-change manner will be described. Herein, the following conditions are based on evaluations of plural research subjects who have a large height difference, including man and woman. The evaluations were conducted by the research subjects who see the back door 10, standing right behind the back door 10 on a road surface R with an upright position.

First, it is preferable from viewpoints of the suppression of the sense of redundancy and the sense of danger that the elapsed time from the start point of the opening action of the back door 10 to the timing the back door 10 has been opened entirely (the time from the origin point to the t6 point in FIG. 3) be set to be within a range of 4.5-5.5 sec. If this time becomes longer than 5.5 sec, it is highly possible for the user to have the sense of redundancy. Meanwhile, in a case of the shorter time than 4.5 sec, it becomes necessary that the opening speed is set to considerably high (fast) or the acceleration is set to be considerably large at least temporarily. This may cause a high possibility that the user has the sense of danger.

The opening action of the back door 10 starts when an opening command by the user is detected, and it is preferable that an initial time (acceleration start timing) from the opening command to the actual start of the opening action of the back door 10 be set to be within a range of nearly 0.6-0.8 sec. If this time is shorter than 0.6 sec, it is highly possible for the user to have the sense of danger because the user does not generally expect an urgent acceleration from the opening-action start. Meanwhile, in a case of the longer time than 0.8 sec, a demand of the user who wants to make an access to the cabin inside early may not be satisfied.

It is preferable from the viewpoints of the suppression of the senses of danger and redundancy that the acceleration in the first acceleration area be set to be within a range of 500-800 mm/ss (s=second). It is preferable from the viewpoints of the suppression of the senses of danger and redundancy that the speed VA in the first constant-speed area be set to be within a range of 300-500 mm/sec. Herein, it seems that the speed VA of 600 mm/see or higher in the first constant-speed area should be avoided because all of the research subjects had the sense of danger.

It is preferable that an elapsed time from the start timing of the first deceleration area, i.e., the opening-action start of the back door 10, to the t2 point at the start of the first deceleration area be 2.7-3.0 sec or longer. In a case where this time is less than 2.7 sec, the timing of the deceleration start is too early, so that the user is made to have the sense of redundancy because it may cause an improperly long waiting time until the open state. It is preferable that the elapsed time to the t2 point at the start of the first deceleration area be set to be within a range of 3±0.3 sec from both requirements that at least the execution time of the first deceleration area of about 2.0 sec needs to be ensured and the gross time until the open state is established needs to be suppressed at 5.5 sec or shorter.

In the above-described first speed-change manner, a preferable relationship between the specified position of the back door 10 which becomes the lower-end position of the back door 10 when the back door 10 is closed and the user (not illustrated) who stands behind the back door 10 on the road surface R will be described.

First, it is preferable that the end timing of the first acceleration area (t1 point in FIG. 3) be set such that the above-described specified position is located in a range below an user's eye position so as not to make the accelerating back door 10 provide the user with the sense of danger. It is more preferable to locate the specified position at a lower level than a position of a user's chin. In a case where the user is considered as a small woman with the height of around 150 cm, the level of the this user's chin position is about 130 cm from the road surface. Accordingly, it is appropriate that the level of the specified position of the back door 10 from the road surface R at the end timing of the first acceleration area is set at 130 cm or lower.

It is preferable that the start timing of the first acceleration area (t2 point in FIG. 3) be set such that the above-described specified position is located in a range above the user's eye position so as not to make the decelerating back door 10 provide the user with the sense of redundancy for the opening action. It is more preferable to locate the specified position at a higher level than a position of a top of a user's head. In a case where the user is considered as a tall man with the height of around 190 cm, it is appropriate that the level of the specified position of the back door 10 from the road surface R at the start timing of the first deceleration area is set at 190 cm or higher.

Figure 4:
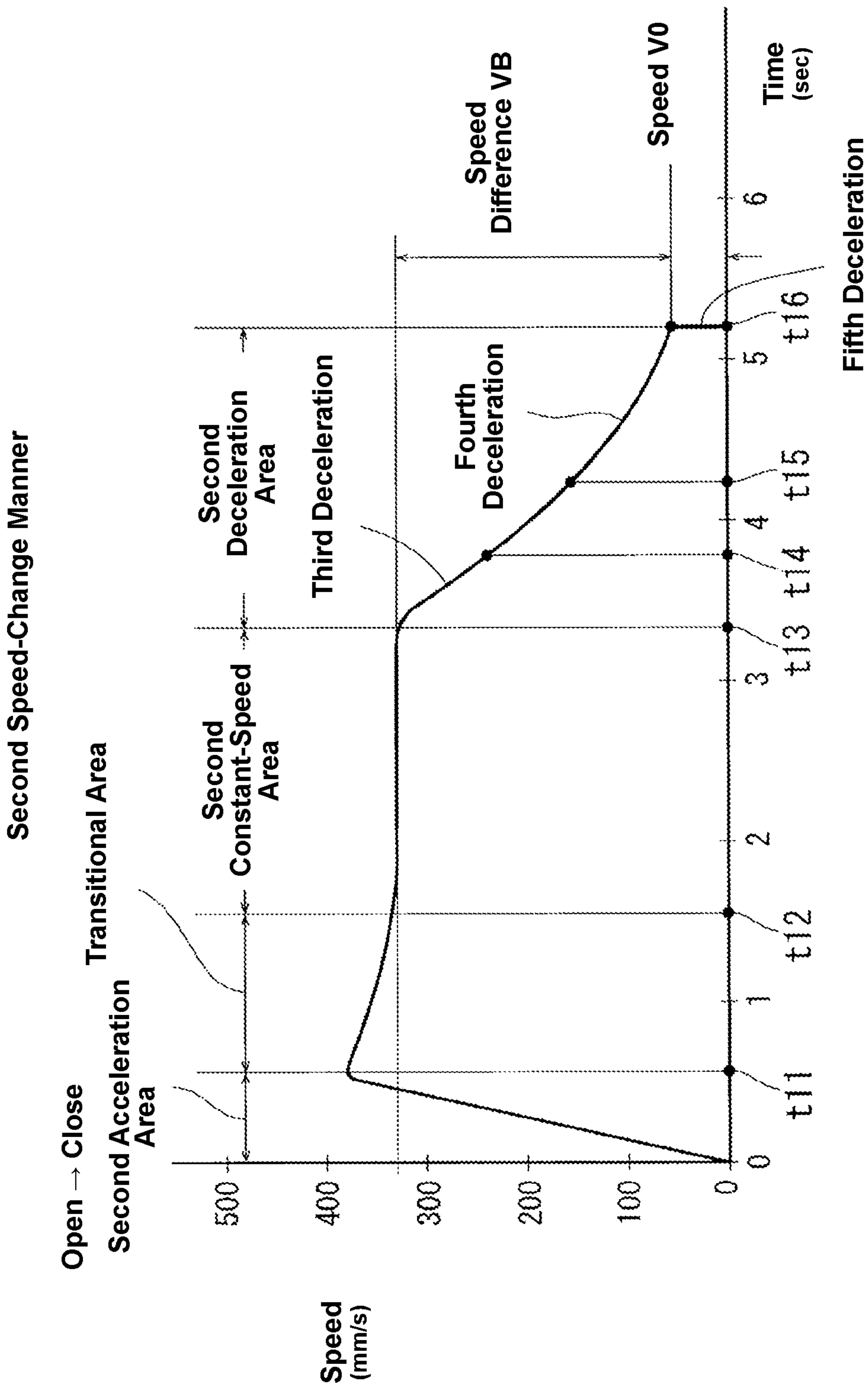
FIG. 4 is a diagram showing a second speed-change manner in a case where the back door is changed from the open state to the closed state.

[3] Closing Action of Back Door [Second Speed-Change Manner Shown in FIG. 4]

In a case where the back door 10 taking the open state (entirely-open state) is closed, the closing of the back door 10 is performed according to a target closing speed shown in FIG. 4. FIG. 4 shows a map with parameters of the time and the target closing speed of the back door 10, which shows a second speed-change manner. Herein, the closing speed (target closing speed) shows a normal-direction speed (normal-direction speed in the closing direction) for an imaginary line which connects the lower-end position (specified position) located at the center, in the vehicle width direction, of the back door 10 taking the closed state and the swinging center (hinges 5) of the back door 10 in the side view.

Details of the second speed-change manner shown in FIG. 4 will be described. First, a starting point of a closing action of the back door 10 is set as an origin point, and an initial area is set as a second acceleration area in which the closing speed increases gradually. While the second acceleration area of the present embodiment is configured such that the closing speed increases linearly, non-liner increasing is also applicable (for example, an initial acceleration is relatively small but the following acceleration becomes relatively large). When the closing action reaches a t11 point, the second acceleration area ends. The second acceleration area ends in a short time of 1 sec or shorter from the closing-action start. It is preferable that the acceleration in the second acceleration area be set to be within a range of 500-800 mmm/ss.

While the closing speed at the t11 point is about 380 mm/s, a second constant-speed area where the closing action continues at a specified constant speed V2 starts at a t12 point after a transitional area where a slight deceleration is executed. The closing speed V2 in the second constant-speed arear is set at around 330 mm/s in the present embodiment, which is lower than the opening speed 400 mm/s in the above-described first constant-speed area shown in FIG. 3. This is because an axial application load acting on the actuator 11 differs between its opening direction and its closing direction and the drive motor of the actuator 11 is a small size (small-output type). If a large-sized motor (large-output type) is used, the closing speed in the second constant-speed area can be equivalent to the opening speed in the first constant-speed area, and also the second constant-speed area can be made to start directly from the second acceleration start, not through the transitional area. Herein, the specified constant speed in the second constant-speed area may have some speed tolerance of about 10%. Further, since the speed V2 in the second constant-speed area is lower than the speed V1 in the first constant-speed area shown in FIG. 3, a third deceleration is set to be smaller than the first deceleration shown in FIG. 3 to which the third deceleration corresponds. However, the third deceleration can be made be a larger deceleration similarly to the first deceleration by using the large-sized drive motor (large-output type) and thereby making the speed V2 in the second constant-speed area be higher.

The second constant-speed area ends at a t13 point. A second deceleration area where the closing action is executed with deceleration starts at this t13 point. The deceleration in the second deceleration area is set to be, in order after the deceleration start, a third deceleration, a fourth deceleration which is smaller than the second deceleration, and a fifth deceleration which is larger than the third deceleration.

The third deceleration corresponds to the first deceleration shown in FIG. 3, and the fourth deceleration corresponds to the second deceleration shown in FIG. 3. The fifth deceleration is a unique one in the closing action. That is, a t16 point when the fifth deceleration is executed is substantially a timing just before completion of the closing action, when a closing speed V0 is secured. This closing speed V0 is the speed to secure the energy which is necessary to attain the half-latch state considering an own weight of the back door 10, and the fifth deceleration is the deceleration to execute the closing action for the half-latch state all at once. The half-latch state is attained at the t16 point, when a closing action control by the actuator 11 ends. After this t16 point, a full-latch state is established by an operation of the latch motor, which will be described later.

The third deceleration and the fourth deceleration are configured to be of a nearly liner shape, respectively, and to be smoothly continuous to each other. A relationship between the third deceleration and the fourth deceleration corresponds to a relationship between the first deceleration and the second deceleration shown in FIG. 3.

First, in a case where the gross execution time of the second deceleration area (the time from the t13 point to the t16 point) is represented as TB, a border point between the third deceleration and the fourth deceleration is set at a point when the time of 0.4-0.6 TB passes from the t13 point as the deceleration start point. In particular, the fourth deceleration performs the extremely-slow closing action, which is the action capable of providing the high-quality feeling. In order to make the user feel this fourth deceleration to cause the high-quality feeling sufficiently (securely), it is preferable that the execution time (the time from a t15 point to a t1 point in FIG. 4) of the fourth deceleration be prolonged (for example, 0.8 sec or longer, preferably at 1.0 sec or longer).

Since the fourth deceleration which is the small deceleration is applied in a range from the point slightly before the closing-action end of the back door 10 to the closing-action end of the back door 10, the closing action can be provided with the high-quality feeling, the impact can be properly small in the closing state (suppression of the kinetic-energy loss, suppression of the noise generation, and improvement of the durability of the members), and the energy consumption of the battery can be properly reduced because of decreasing of the drive energy (electricity) of the actuator 11.

A preferable setting example of the third deceleration and the fourth deceleration will be described. Hereafter, the gross time from the t13 point when the second deceleration area starts to the t16 point when the closing action by means of the actuator 11 substantially ends is represented as TB, and a speed difference between the closing speed V2 in the second constant-speed area and the closing speed V0 at the t16 point is represented as VB. Further, a point of an elapsed time TB/4 from the t13 point as the deceleration start point is represented as t14, and another point of an elapsed time TB/2 from the t13 point is represented as t15.

The speed at the t14 point is set at the vicinity of 70% of VB (in a case where a range of the vicinity is set at ±10%, this speed is set at 0.7 VB±0.1 VB in the present embodiment). Further, the speed at the t15 point is set at 40% of VB or less (this speed is set at 0.4 VB in the present embodiment). The speed at the t14 point and the speed at the t15 point are set to be smoothly continuous to each other by way of the speed at the point t16. Herein, the third deceleration and the fourth deceleration may be set to have a liner (straight line) shape, respectively (no smooth connection).

Compared to the above-described speed setting in the second deceleration area, a first comparative manner in which the third deceleration has a larger deceleration (the speeds at the t14, t15 points are lower than those shown in FIG. 4) is considered. In this first comparative manner, the possibility that the user feels so quick deceleration in the initial state and also the user has the sense of redundancy because of the longer time of the closing action with the fourth deceleration may become high.

In a second comparative example in which the third deceleration has a considerably smaller deceleration (for example, the speeds at the t14, t15 points are higher than those shown in FIG. 4), compared to the above-described speed setting in the second deceleration area, it becomes difficult for the user to feel the difference between the third deceleration and the fourth deceleration (the deceleration becomes a linear-like deceleration as a whole), so that the effect of providing the user with the high-quality feeling which may be caused by the fourth deceleration may be deteriorated. Herein, in order to make the user feel the fourth deceleration clearly, it is preferable that the fourth deceleration be set to be sufficiently smaller than the third deceleration, e.g., at ½ of the third deceleration or less, and more preferably ⅓ or less.

Other preferable conditions to be considered in setting the second speed-change manner will be described. Herein, the following conditions are based on the evaluations of plural research subjects who have the large height difference, including man and woman. The evaluations were conducted by the research subjects who see the back door 10, standing right behind the back door 10 on the road surface R with the upright position.

First, it is preferable from viewpoints of the suppression of the sense of redundancy and the sense of danger that the elapsed time from the start point of the closing action of the back door 10 taking the open state (entirely-open state) to the timing the back door 10 has been closed entirely (the time from the origin point to the t16 point in FIG. 4) be set to be within the range of 4.5-5.5 sec. If this time becomes longer than 5.5 sec, it is highly possible for the user to have the sense of redundancy. Meanwhile, in a case of the shorter time than 4.5 sec, it becomes necessary that the opening speed is set to considerably high (fast) or the acceleration is set to be considerably large at least temporarily. This may cause the high possibility that the user has the sense of danger.

The closing action of the back door 10 starts when a closing command by the user is detected, and it is preferable that an initial time (acceleration start timing) from the closing command to the actual start of the closing action of the back door 10 be set to be within the range of nearly 0.6-0.8 sec. If this time is shorter than 0.6 sec, it is highly possible for the user to have the sense of danger because the user does not generally expect an urgent acceleration from the closing-action start. Meanwhile, in a case of the longer time than 0.8 sec, this may be possibly against the user who wants to close the back door 10 properly quickly.

It is preferable in terms of the suppression of the senses of redundancy and danger that the acceleration in the second acceleration area be set to be within a range of 500-700 mmm/ss (s=second). It is preferable from the viewpoints of the suppression of the senses of danger and redundancy that the speed V2 in the second constant-speed area be set to be within the range of 300-500 mm/sec. Herein, it seems that the speed V2 of 600 mm/see or higher in the second constant-speed area should be avoided because all of the research subjects had the sense of danger.

It is preferable that an elapsed time from the start timing of the second deceleration area, i.e., the closing-action start of the back door 10, to the t13 point at the start of the second deceleration area be 2.7-3.0 sec or longer. In a case where this time is less than 2.7 sec, the timing of the deceleration start is too early, so that the user is made to have the sense of redundancy because it may cause an improperly long waiting time until the closing state. It is preferable that the elapsed time to the t13 point at the start of the second deceleration area be set to be within the range of 3±0.3 sec from both requirements that at least the execution time of the second deceleration area of about 2.0 sec needs to be ensured and the gross time until the closing state is established needs to be suppressed at 5.5 sec or shorter.

It is preferable that the end timing of the second acceleration area (t11 point in FIG. 4) be set such that the above-described specified position is located in the range above the user's eye position so as not to make the accelerating back door 10 provide the user with the sense of redundancy for the closing action. It is more preferable to locate the specified position at the higher level than the position of the top of the user's head. In a case where the user is considered as the tall man with the height of around 190 cm, it is appropriate that the level of the specified position of the back door 10 from the road surface R at the end timing of the second deceleration area is set at 190 cm or higher.

It is preferable that the start timing of the second acceleration area (t13 point in FIG. 4) be set such that the above-described specified position is located in the range below the user's eye position so as not to make the decelerating back door 10 provide the user with the sense of redundancy. It is more preferable to locate the specified position at the lower level than the position of the user's chin. In a case where the user is considered as the small woman with the height of around 150 cm, it is appropriate that the level of the specified position of the back door 10 from the road surface R at the start timing of the second acceleration area is set at 130 cm or lower.

Figure 5:
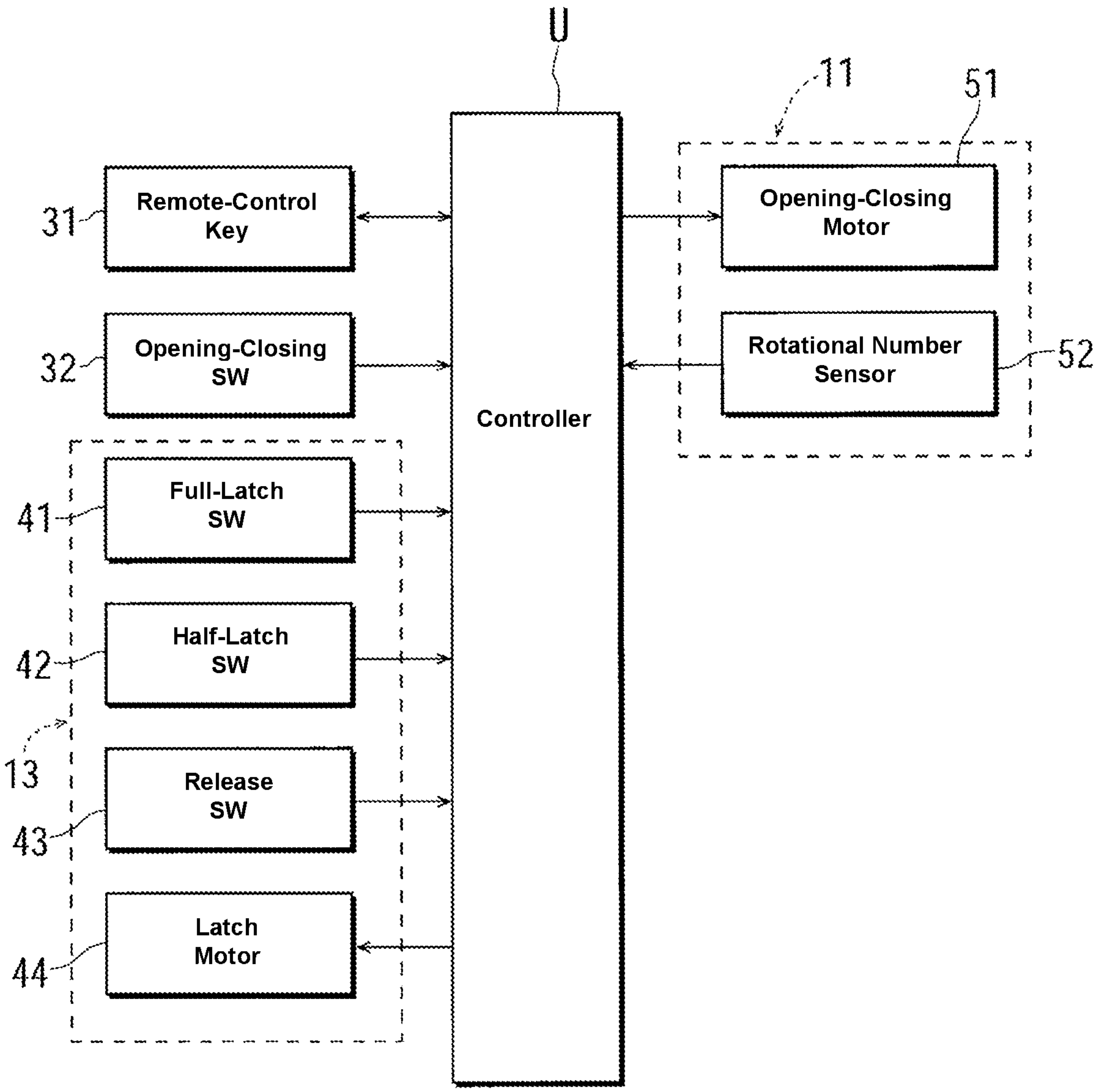
FIG. 5 is a block diagram showing a control-system example of the present invention.
Figure 6:
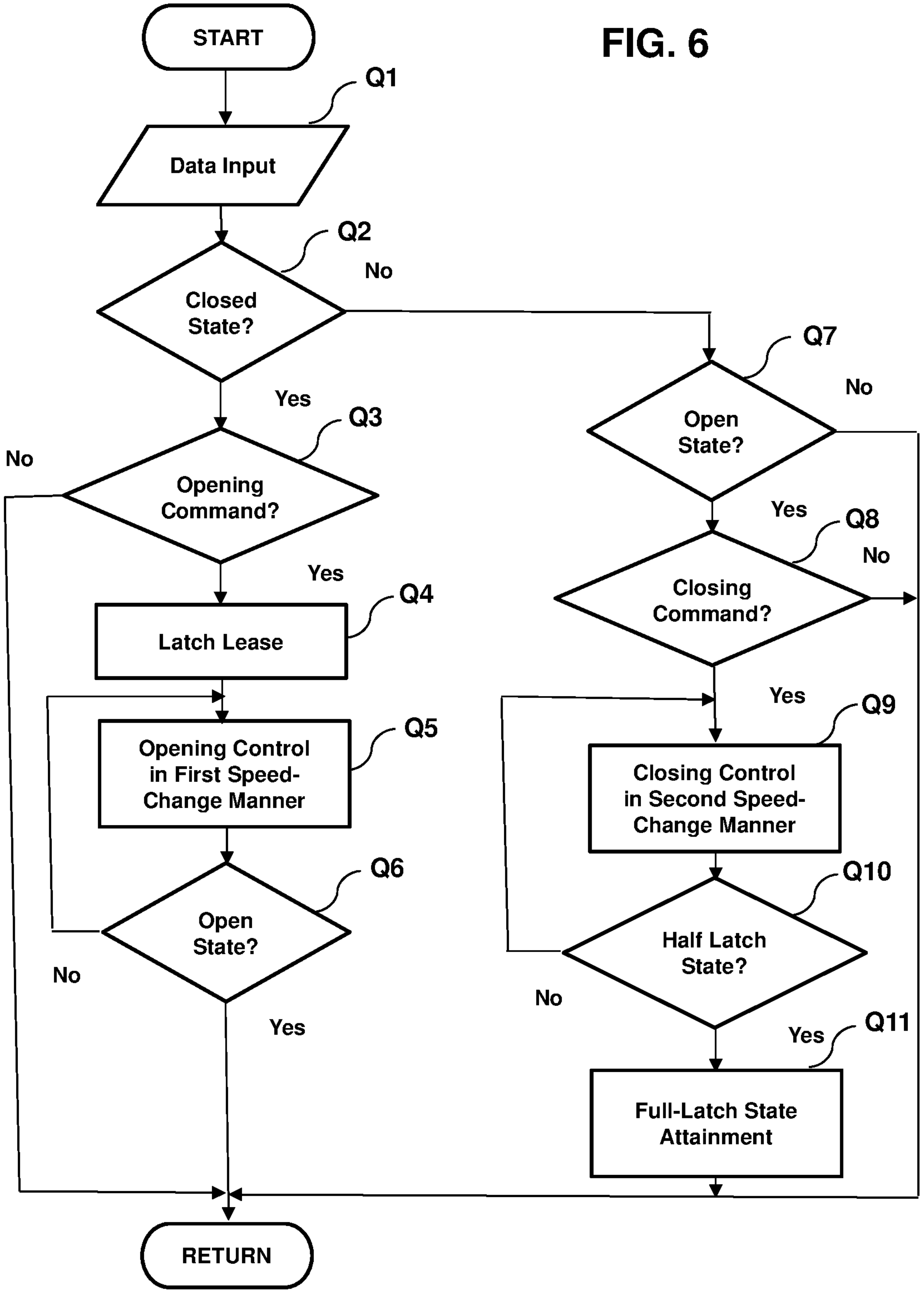
FIG. 6 is a flowchart showing a control example of the present invention.

[4] Example of Control [FIGS. 5 and 6]

FIG. 5 shows an example of a control system of the present invention. Reference character U in the figure denotes a controller (control unit) which is constituted by using a microcomputer. Further, FIG. 5 shows details of components to constitute the latch 13. That is, the latch 13 comprises a full-latch switch 41 to detect the full-latch state, a half-latch switch 42 to detect the half-latch state, a release switch 43 to detect a release state where the latch is released, and a latch motor 44. Signals of these switches 41-43 are inputted to the controller U, and the latch motor 44 is driven and controlled by the controller U.

A signal of a remote-control key 31 and a signal of an opening-closing switch 32 which is provided at the vehicle body are inputted to the controller U. The remote-control key 31 is carried by the user and configured to perform the opening command and the closing command of the back door 10. The opening-closing switch 32 is provided at the vehicle body and configured to perform the opening command and the closing command of the back door 10 according to an operation of the user. This opening-closing switch 32 can be provided near an operation knob of the back door 10, for example. Further, the opening-closing switch 32 can be a switch which is configured to scan a space below a rear bumper and perform at least one of the opening command and the closing commend when something which is moving in the space below the rear bumper (e.g., when the user who carries baggage is swiping the user's toe portion in the space below the rear bumper) is detected on a premise that the vehicle is in a stop state and the remote-control key 31 exists around here. The controller U also serves as an opening-command detection portion to detect the opening command and a closing-command detection portion to detect the closing command.

The actuator 11 comprises an opening-closing motor 51 and a rotational-number sensor 52 to detect the rotational number of the opening-closing motor 51. The rotational number detected by the rotational-number sensor 52 corresponds to the opening-closing speed of the back door 10. The controller U controls driving of the opening-closing motor 51 (a feedback or feedforward control) based on the signal of the rotational-number sensor 52 so that the opening-closing speed of the back door 10 can match the target speed shown in FIG. 3 or 4.

FIG. 6 is a flowchart showing an example of the opening-closing control of the back door 10 which is performed by the controller U. Hereafter, the flowchart will be described by using processing steps Q1-Q11.

First, data of the various signals of the respective output keys are inputted in the step Q1, and it is determined whether the back door 10 takes the closing state (i.e., the back door 10 is closed) in the step Q2. This closing-state determination of the back door 10 can be attained by checking detection states of the switches 41-43 or a state (expansion amount) of the actuator 11, for example. Herein, while the expansion amount of the actuator 11 can be obtained by tracking and memorizing a change of the rotational number of the rotational-number sensor 52 over time, a position sensor to detect the position of the back door 10 may be provided additionally and the expansion amount of the actuator 11 may be obtained by using a detection signal of this position sensor. While this position sensor can be installed into the actuator 11, it may be provided at respective positions of the vehicle body which correspond to an entirely-closed position and an entirely-open position of the back door 10.

When the determination in the step Q2 is YES, it is determined whether the opening command is performed in the step Q3. This determination in the step Q3 can be conducted by checking the input signals of the remote-control key 31 and the opening-closing switch 32. When the determination in the step Q3 is NO, a control sequence returns to the step Q1.

When the determination in the step Q3 is YES, the latch motor 44 is driven and the latch state is released in the step Q4. Herein, the releasing of the latch can be confirmed by checking the detection signal of the release switch 43.

Subsequently to the step Q4, the drive control of the actuators 11 is performed so that the opening speed of the back door 10 can match the target speed of the first speed-change manner shown in FIG. 3 in the step Q5. In the step Q6 after the step Q5, it is determined whether the back door 10 takes the open state (entirely-open state). This determination can be conducted by checking the expansion amount of the actuator 11 or the signal of the above-described position sensor, for example. In an initial stage, the determination in the step Q6 is NO, and subsequently processing of the step Q5 is executed. Once the back door 10 comes to take the open state (entirely-open state), the determination in the step Q6 turns to YES and the control sequence goes back to the step Q1.

When the determination in the step Q2 is NO, the control sequence proceeds to the step Q7, where it is determined whether the back door 10 takes the open state (entirely-open state). When its determination is NO, the control sequence returns to the step Q1.

When the determination in the step Q7 is YES, it is determined whether the closing command is performed in the step Q8 (corresponding to the step Q3). When this determination is NO, the control sequence returns to the step Q1.

When the determination in the step Q8 is YES, the drive control of the actuators 11 is performed so that the closing speed of the back door 10 can match the target speed of the second speed-change manner shown in FIG. 4 in the step S9 (corresponding to the processing of the step Q5). In the step Q10 after the step Q9, it is determined whether the half-latch state is attained. This determination in the step Q10 can be conducted by checking the detection signal of the half-latch switch 42. The determination in the step Q10 is NO in the initial stage, and subsequently the control of the step Q9 is executed.

When the determination in the step Q10 becomes YES, the latch motor 44 is driven and the full-latch state is attained in the step Q11. Then, the control sequence returns to the step Q1.

The present invention should not be limited to the above-described embodiment, and any other modifications or improvements may be applied within the scope of the claims of the present invention. For example, the opening-closing body is not limited to the back door but may be a side door. Further, the opening-closing pattern of the opening-closing body may be a laterally swinging type or a longitudinally sliding type. Of course, the object of the present invention includes not only explicitly-described one but implicitly-suggested one.

The present invention is preferable in performing the opening-closing control of the back door or the like.

What is claimed is:

1. An opening-closing body control device of a vehicle, comprising:

an opening-closing body constituting a part of a vehicle body and partitioning an inside of the vehicle body from an outside of the vehicle body in a closed state;

a drive section to open or close the opening-closing body;

an opening-command detection section to detect an opening command of the opening-closing body by a user; and a drive control section to control the drive section such that the opening-closing body is opened by a predetermined first speed-change manner when the opening-command detection section detects the opening command in the closed state of the opening-closing body, wherein said first speed-change manner is configured to comprise a first acceleration area where the opening of the opening-closing body is accelerated, a first constant-speed area where the opening of the opening-closing body is performed substantially at a constant speed, which follows said first acceleration area, and a first deceleration area where the opening of the opening-closing body is decelerated, which follows said first constant-speed area, and said first deceleration area is configured such that a second deceleration of the opening of the opening-closing body at a point just before the opening of the opening-closing body comes to an end is smaller than a first deceleration of the opening of the opening-closing body at a deceleration start point, wherein acceleration in said first acceleration area is set to be within a range of 500-800 mm/ss (s=second).

2. The opening-closing body control device of the vehicle of claim 1, wherein said opening-closing body is a back door to open or close a rear opening portion formed at a rear part of the vehicle body, which is provided to swing in a vertical direction around a hinge provided at an upper portion of the back door.

3. The opening-closing body control device of the vehicle of claim 2, wherein when said back door is swingingly opened upwardly, an acceleration end timing of said first acceleration area in said first speed-change manner is set such that a level of a specified position of the back door which becomes a lower-end position when the back door is closed is located at 130 cm or lower from a ground level, whereas a deceleration start timing of said first deceleration area in said first speed-change manner is set such that the level of said specified position of the back door is located at 190 cm or higher from the ground level.

4. The opening-closing body control device of the vehicle of claim 1, wherein in a case where an elapsed time from a deceleration start to a deceleration end in said first deceleration area is represented as TA and an opening speed in said first constant-speed area is represented as VA, a border point between said first deceleration and said second deceleration is set to be within a range of 0.4-0.6 TA from the deceleration start, deceleration from said first deceleration to said second deceleration is changed smoothly, and the opening speed at a point of the elapsed time TA/4 from the deceleration start is set at around 0.5 VA, whereas the opening speed at a point of the elapsed time TA/2 from the deceleration start is set at 0.3 VA or lower, said opening-closing body is a back door to open or close a rear opening portion formed at a rear part of the vehicle body, which is provided to swing in a vertical direction around a hinge provided at an upper portion of the back door, and when said back door is swingingly opened upwardly, an acceleration end timing of said first acceleration area in said first speed-change manner is set such that a level of a specified position of the back door which becomes a lower-end position when the back door is closed is located at 130 cm or lower from a ground level, whereas a deceleration start timing of said first deceleration area in said first speed-change manner is set such that the level of said specified position of the back door is located at 190 cm or higher from the ground level.

5. An opening-closing body control device of a vehicle, comprising:

an opening-closing body constituting a part of a vehicle body and partitioning an inside of the vehicle body from an outside of the vehicle body in a closed state;

a drive section to open or close the opening-closing body;

a closing-command detection section to detect a closing command of the opening-closing body by a user; and a drive control section to control the drive section such that the opening-closing body is closed by a predetermined second speed-change manner when the closing-command detection section detects the closing command in an open state of the opening-closing body, wherein said second speed-change manner is configured to comprise a second acceleration area where the closing of the opening-closing body is accelerated, a second constant-speed area where the closing of the opening-closing body is performed substantially at a constant speed, which follows said second acceleration area, and a second deceleration area where the closing of the opening-closing body is decelerated, which follows said second constant-speed area, and said second deceleration area is configured such that the deceleration of the closing of the opening-closing body comprises a third deceleration, a fourth deceleration which is smaller than said third deceleration, and a fifth deceleration which is larger than said third deceleration which are positioned in order from a deceleration start, wherein said fifth deceleration is the deceleration at a point just before the closing of the opening-closing body comes to an end, wherein said opening-closing body is a full-latch type in which the opening-closing body is fully closed by way of a half-latch state, a shifting point when the deceleration of the closing of the opening-closing body is shifted from said fourth deceleration to said fifth deceleration is set at a start point of said half-latch state, and a closing speed of the opening-closing body at said start point of the half-latch state is set at a closing speed capable of attaining the half-latch state or higher.

6. The opening-closing body control device of the vehicle of claim 5, wherein in a case where an elapsed time from a deceleration start to said start point of the half-latch state in said second deceleration area is represented as TB and a difference between a closing speed in said second constant-speed area and said closing speed at the start point of the half-latch state is represented as VB, the closing speed at a point of the elapsed time TA/4 from the deceleration start is set at around 0.7 VB, whereas the closing speed at a point of the elapsed time TB/2 from the deceleration start is set at 0.4 VB or lower.

7. The opening-closing body control device of the vehicle of claim 5, wherein in a case where an elapsed time from a deceleration start to said start point of the half-latch state in said second deceleration area is represented as TB, a border point between said third deceleration and said fourth deceleration is set to be within a range of 0.4-0.6 TB from the deceleration start in the second deceleration area.

8. The opening-closing body control device of the vehicle of claim 5, wherein acceleration in said second acceleration area is set to be within 500-800 mm/ss (s=second).

9. The opening-closing body control device of the vehicle of claim 5, wherein said opening-closing body is a back door to open or close a rear opening portion formed at a rear part of the vehicle body, which is provided to swing in a vertical direction around a hinge provided at an upper portion of the back door.

10. The opening-closing body control device of the vehicle of claim 9, wherein when said back door is swingingly closed downwardly, an acceleration end timing of said second acceleration area in said second speed-change manner is set such that a level of a specified position of the back door which becomes a lower-end position when the back door is closed is located at 190 cm or higher from a ground level, whereas a deceleration start timing of said second deceleration area in said second speed-change manner is set such that the level of said specified position of the back door is located at 130 cm or lower from the ground level.

11. The opening-closing body control device of the vehicle of claim 5, wherein in a case where an elapsed time from a deceleration start to said start point of the half-latch state in said second deceleration area is represented as TB and a difference between a closing speed in said second constant-speed area and said closing speed at the start point of the half-latch state is represented as VB, a border point between said third deceleration and said fourth deceleration is set to be within a range of 0.4-0.6 TB from the deceleration start in the second deceleration area, and the closing speed at a point of the elapsed time TA/4 from the deceleration start is set at around 0.7 VB, whereas the closing speed at a point of the elapsed time TB/2 from the deceleration start is set at 0.4 VB or lower, acceleration in said second acceleration area is set to be within 500-800 mm/ss (s=second), said opening-closing body is a back door to open or close a rear opening portion formed at a rear part of the vehicle body, which is provided to swing in a vertical direction around a hinge provided at an upper portion of the back door, and when said back door is swingingly closed downwardly, an acceleration end timing of said second acceleration area in said second speed-change manner is set such that a level of a specified position of the back door which becomes a lower-end position when the back door is closed is located at 190 cm or higher from a ground level, whereas a deceleration start timing of said second deceleration area in said second speed-change manner is set such that the level of said specified position of the back door is located at 130 cm or lower from the ground level.

12. An opening-closing body control device of a vehicle, comprising:

an opening-closing body constituting a part of a vehicle body and partitioning an inside of the vehicle body from an outside of the vehicle body in a closed state;

a drive section to open or close the opening-closing body;

an opening-command detection section to detect an opening command of the opening-closing body by a user;

a closing-command detection section to detect a closing command of the opening-closing body by a user; and a drive control section to control the drive section such that the opening-closing body is opened by a predetermined first speed-change manner when the opening-command detection section detects the opening command in the closed state of the opening-closing body and that the opening-closing body is closed by a predetermined second speed-change manner when the closing-command detection section detects the closing command in an open state of the opening-closing body, wherein said first speed-change manner is configured to comprise a first acceleration area where the opening of the opening-closing body is accelerated, a first constant-speed area where the opening of the opening-closing body is performed substantially at a constant speed, which follows said first acceleration area, and a first deceleration area where the opening of the opening-closing body is decelerated, which follows said first constant-speed area, said first deceleration area is configured such that a second deceleration of the opening of the opening-closing body at a point just before the opening of the opening-closing body comes to an end is smaller than a first deceleration of the opening of the opening-closing body at a deceleration start point, said second speed-change manner is configured to comprise a second acceleration area where the closing of the opening-closing body is accelerated, a second constant-speed area where the closing of the opening-closing body is performed substantially at a constant speed, which follows said second acceleration area, and a second deceleration area where the closing of the opening-closing body is decelerated, which follows said second constant-speed area, and said second deceleration area is configured such that the deceleration of the closing of the opening-closing body comprises a third deceleration, a fourth deceleration which is smaller than said third deceleration, and a fifth deceleration which is larger than said third deceleration which are positioned in order from a deceleration start, wherein said fifth deceleration is the deceleration at a point just before the closing of the opening-closing body comes to an end, wherein said opening-closing body is a back door to open or close a rear opening portion formed at a rear part of the vehicle body, which is provided to swing in a vertical direction around a hinge provided at an upper portion of the back door, when said back door is swingingly opened upwardly, an acceleration end timing of said first acceleration area in said first speed-change manner is set such that a level of a specified position of the back door which becomes a lower-end position when the back door is closed is located at 130 cm or lower from a ground level, whereas a deceleration start timing of said first deceleration area in said first speed-change manner is set such that the level of said specified position of the back door is located at 190 cm or higher from the ground level, and when said back door is swingingly closed downwardly, an acceleration end timing of said second acceleration area in said second speed-change manner is set such that the level of said specified position of the back door is located at 190 cm or higher from the ground level, whereas a deceleration start timing of said second deceleration area in said second speed-change manner is set such that the level of said specified position of the back door is located at 130 cm or lower from the ground level.

13. The opening-closing body control device of the vehicle of claim 12, wherein an elapsed time from an opening start to an opening end of the opening-closing body in said first speed-change manner is set to be within a range of 4.5-5.5 sec, and an elapsed time from a closing start to a closing end of the opening-closing body in said second speed-change manner is set to be within the range of 4.5-5.5 sec.

* * * * *